United States Patent [19]

Folmer, Jr.

[11] 3,853,503
[45] Dec. 10, 1974

[54] ENERGY ABSORBER FOR LASER PYROLYSIS

[75] Inventor: Orville F. Folmer, Jr., Ponca City, Okla.

[73] Assignee: Continental Oil Company, Ponca City, Okla.

[22] Filed: June 4, 1973

[21] Appl. No.: 366,810

[52] U.S. Cl. .................................. 55/67, 23/232 C
[51] Int. Cl. ............................................ B01d 15/08
[58] Field of Search ............ 55/67, 197; 23/230 PC, 23/232 C, 253 PC; 219/121 L, 121 LM

[56] References Cited
UNITED STATES PATENTS

| | | | |
|---|---|---|---|
| 3,475,131 | 10/1969 | Keulemans | 23/230 PC |
| 3,491,512 | 1/1970 | Timmins et al. | 55/67 |
| 3,511,029 | 5/1970 | Azarraga et al. | 55/67 |

OTHER PUBLICATIONS

Gas Chromatography Abstracts 1972: 740. Laser Pyrolysis Gas Chromatography., Folmer, O. F. from Anal. Chem. 43 (8) 1057–1065 (1971).

*Primary Examiner*—John Adee

[57] ABSTRACT

Solid and liquid samples are prepared for analysis by gas-liquid chromatography via laser-induced vaporization and/or molecular fragmentation by contacting the sample with a powdered metal selected from the group consisting of iron, copper, gold, and tantalum previous to subjecting same to a laser beam for pyrolysis.

2 Claims, No Drawings

ENERGY ABSORBER FOR LASER PYROLYSIS

BACKGROUND OF THE INVENTION

This invention relates to analysis of solid or liquid materials by chromatography via laser-induced vaporization and/or molecular fragmentation. More specifically, the invention relates to the preparation of such materials for laser beam pyrolysis by contacting a portion thereof with a powdered metal selected from the group consisting of iron, copper, gold, and tantalum.

The use of chromatography as an analytical tool has been increasing greatly, and the methods and apparatus available have been improving rapidly. Gas-liquid chromatography generally involves injection of a slug of sample vapor to be analyzed into a flowing stream of inert gas, known as carrier gas. The stream containing the slug of sample vapor is then passed to a separation zone wherein it contacts a partitioning agent which is usually coated on a particulate solid support. The partitioning agent, often a liquid or a waxy or resinous solid, is chosen to exhibit varying degrees of affinity for the various components of the sample vapor, with the result that the emerging carrier gas stream contains zones of separated sample components. Detection of the shape and size of such component zones, as by measuring the thermal conductivity of the emerging gas stream, completes the analysis. Comparison of the zone or peak size, shape, and sequence with those of known components under the same conditions permits the interpretation as to component identity and even quantity. It is obvious, however, that this analytical technique requires that the sample be in gas or vapor form. Materials not readily volatilized, such as liquids or solids, have been analyzed chromatographically by pyrolyzing or thermal disintegrating the sample molecule into gaseous fragments and separating the fragments into peaks. The resulting peak trace is useful either by actually identifying the chemical species responsible for each peak or by comparison of the trace shape to that of known material analogous to fingerprinting or voice printing.

In U.S. Pat. No. 3,511,029, it is disclosed that one of the most advantageous means of pyrolyzing solid and liquid material for chromatographic analysis is by bombarding them with laser energy. However, a very significant problem arose in the use of laser beams to pyrolysis samples because some substances were found to be transparent to the wavelength of a laser beam. These transparent materials were found to either not pyrolyze at all, or give very erratic results which were useless for subsequent analysis.

Various attempts have been made to solve this problem found in the utilization of laser energy. One well-known method is to mix powdered carbon with the sample material and another is to apply a layer of the sample material to a cobalt glass surface. Both of these previous attempts have exhibited certain disadvantages. Among the more significant of these are: first, in regard to powdered carbon, for usable results, the carbon must be intimately mixed with the sample. This requires melting or grinding of the sample, or both, in order to adequately mix same in the carbon which is very difficult to accomplish with some materials and impossible with others. Another disadvantage in using carbon and of great significance is the fact that samples mixed with carbon give different relative amounts of fragment products upon pyrolysis with laser energy. The relative amounts of these fragment compounds vary with the different concentrations of carbon in the sample. Therefore, in order to meaningfully compare two samples mixed with carbon, both must have the same percentage of carbon added before pyrolysis. This is true even if one of the samples is of the opaque type which could be run without carbon as an energy absorber. In regard to the cobalt glass method, it requires that the sample be softened and pressed against the glass where the previous discussed problem of melting the sample would again arise. Further, even though it is reported that the cobalt glass method is satisfactory with a ruby laser, it will not operate with a neodymium-glass laser.

It is accordingly an object of this invention to provide an improved chromatographic analysis method. Another object of the invention is to provide an improved method for preparing a sample for chromatographic analysis via laser energy pyrolysis which will result in a less complex, more reproducible, or more selective result. Other objects, aspects, and the several advantages of the present invention will be come apparent upon a further reading of this disclosure and the appended claims.

It has now been found that the objects of the present invention can be achieved, in a process for preparing a material for subsequent analysis by pyrolyzing a portion thereof with a laser beam, by contacting said material with a powdered metal selected from the group consisting of iron, copper, gold, and tantalum prior to pyrolyzing same.

It is essential for achieving the objects of the present invention that the energy absorbing material absorb energy from the laser beam, convert it to heat and subsequently transfer the heat to the sample material as efficiently as possible. Further, the absorber should not cause side reactions which alter the amounts or types of products upon pyrolysis. Thus, the absorber of the present invention should be in intimate contact with the sample material, yet free passage of the gaseous products of pyrolysis should be allowed. Therefore, an ideal material should be an inert, finely divided material which is a good absorber of laser beam wavelengths.

It has been found that iron, copper, gold, and tantalum, meet the above-described criteria and are particularly good energy absorbers. Preferable results have been obtained with iron powder which is a readily available and inexpensive material. It is also black and inert in the environment in which it is to be utilized. It is not a strong catalyst and is readily available in pure form.

In the operation of the present invention, the sample needs no further preparation than simply being pressed down onto a bed of elemental metal powder. No melting of the sample is required. When using the elemental metals of the present invention, the relative amounts of fragment products are the same when the sample is pyrolyzed with them as they are when pyrolyzed without them. The elemental metals of the present invention absorb energy from any of the laser beams presently available on the market.

Through the utilization of the metals of the present invention, a sample material which is opaque enough to be pyrolyzed itself can be compared to a sample material which must be pyrolyzed on metal powder because of its transparency. Therefore, the present invention provides the art with the unique ability to pyrolyze any sample via laser energy and compare the results with those obtained from any other sample regardless of the transparency of the samples. This ability was heretofore inavailable to workers in the art.

In order to achieve good reproducible results for subsequent analysis, the products of pyrolysis should be dependent only on the sample material itself and not on the particular energy absorber utilized. Ideally for a given sample material, an energy absorber would be chosen which would react with the sample to produce a pyrolysis fragment product which could be easily identified and/or measured and would be characteristic of some particular structure or other characteristic of the sample material. The present invention provides such a method through the utilization of the elemental powders of same.

The use of the elemental metal powders of the present invention rather than compounds is critical in achieving good results, because there is sufficient energy from a laser beam to cause dissociation of compounds into very reactive component parts (i.e., radicals and ions) which would react to produce products which would not be produced were that compound not present.

The following comperative examples are shown to illustrate the improved results of the effective operation of the improved process described herein over previously utilized methods. In the following examples, Eastman Imperial green polyethylene was utilized as the sample material because it can be pyrolyzed reproducibly without an energy absorber, yet it is transparent enough to show any effects from reaction with an absorber. The laser used for pyrolysis of the sample materials was a neodymium-glass laser, the rod being 3 ¼-inch long and ¼-inch in diameter, pumped by a xenon flash tube, and had an energy output of about 2.80 joules with a pulse duration of about 400 μsec. In each of the runs, the largest peak was set to equal 100 and each of the other peaks calculated as the ratio the largest peak. The mean ratios were them compared using the Student T statistic. In this case, by comparing two sets of triplicates, the number of degrees of freedom was four and the value of the Student T statistic was 2.776 for a 5 percent probability error ($\alpha$). Therefore, in the examples, if the calculated T value is greater than 2.776 or less than −2.776, the ratio means were said to be different with one chance in 20 of being in error.

Table I illustrates a comparison of ratio means for the sample material pyrolyzed with iron and without absorber. Under the above described criteria, none of the samples were found to be different.

TABLE I

Comparison of Fragmentation Patterns of
Green Imperial Polyethylene Pyrolyzed
without Absorber and on Iron Powder

| Retention Time, Sec. | MEAN PEAK RATIOS | | Student T Value |
|---|---|---|---|
| | Iron Powder | Without Absorber | |
| 218.2 | 50.99 | 50.48 | 0.142 |
| 461.3 | 100 | 100 | 0 |
| 493.8 | 3.77 | 3.94 | −0.505 |
| 605.3 | 66.92 | 84.36 | −1.084 |
| 992.5 | 16.39 | 17.49 | −1.032 |
| 1062.2 | 3.39 | 3.73 | −0.742 |
| 1180.0 | 4.69 | 5.24 | −0.904 |
| 1452.8 | 4.41 | 5.77 | −2.29 |
| 1531.0 | 10.21 | 10.96 | −1.16 |

TABLE I-Continued

Comparison of Fragmentation Patterns of
Green Imperial Polyethylene Pyrolyzed
without Absorber and on Iron Powder

| Retention Time, Sec. | MEAN PEAK RATIOS | | Student T Value |
|---|---|---|---|
| | Iron Powder | Without Absorber | |
| 1647.2 | 4.05 | 5.14 | −1.64 |
| 1883.2 | 5.64 | 8.91 | −1.62 |

Table II illustrates a comparison of the sample material pyrolyzed with powdered carbon and without absorber. Six of the 11 ratios are different under the previously described criteria.

TABLE II

Comparison of Fragmentation Patterns of
Green Imperial Polyethylene Pyrolyzed
Without Absorber and on Powdered Coke

| Retention Time, Sec. | MEAN PEAK RATIOS | | Student T Value |
|---|---|---|---|
| | Powdered coke | Without absorber | |
| 217.8 | 19.49 | 50.48 | −12.8 |
| 456.2 | 33.92 | 100 | − 4.30 |
| 490.2 | 0.88 | 3.94 | −11.9 |
| 603.8 | 100 | 84.36 | 1.92 |
| 929.0 | 5.94 | 17.49 | − 7.00 |
| 1071.2 | 2.49 | 3.73 | − 1.14 |
| 1190.0 | 3.03 | 5.24 | − 2.17 |
| 1467.7 | 1.09 | 5.77 | −12.1 |
| 1543.2 | 2.80 | 10.96 | −11.0 |
| 1659.0 | 4.33 | 5.14 | − 0.73 |
| 1892.7 | 12.81 | 8.91 | 1.21 |

The greater amount of acetylene produced when powdered coke is utilized as the absorber is a very distinctive difference from the results obtained with iron powder.

Table III illustrates a comparison of acetylene-ethylene ratios for various polymers pyrolyzed with carbon and with iron. In all runs, the acetylene-ethylene ratio was much larger when carbon was used.

TABLE III

Acetylene-Ethylene Ratios

| | $C_2H_2/C_2H_4$ Ratios | |
|---|---|---|
| | Iron powder | Carbon powder |
| Low MW Polyethylene | 1.12 | 5.18 |
| High MW Polyethylene | 3.53 | 16.1[a] |
| Green Imperial Polyethylene[b] | 0.67 | 2.95 |
| Silicone Rubber | 1.30 | 8.40[a] |
| Polyvinyl Chloride | 1.29 | 9.90[a] |

[a]These were single runs.
[b]The $C_2H_2/C_2H_4$ ratio for this sample pyrolyzed without absorber is 0.84.

Having thus described the invention by providing examples thereof, it is to be understood that no undue limitations or restrictions are to be drawn by reason thereof and that many variations and modifications are within the scope of the invention.

I Claim:

1. In a method for preparing a material for gas-liquid chromatographic analysis by pyrolyzing a portion thereof with a laser beam, the improvement comprises pyrolyzing said material while in intimate contact with a powdered metal selected from the group consisting of iron, copper, gold and tantalum.

2. The improvement of claim 1 wherein said material is transparent to the wavelength of a laser beam.

* * * * *